United States Patent
Bitran et al.

(10) Patent No.: US 9,258,833 B2
(45) Date of Patent: Feb. 9, 2016

(54) LTE/WI-FI COEXISTENCE

(75) Inventors: Yigal Bitran, Ramat Hasharon (IL); Ariel Yagil, Ein Sarid (IL)

(73) Assignee: ALTAIR SEMICONDUCTOR LTD., Hod-Hasharon (IL)

( * ) Notice: Subject to any disclaimer, the term of this patent is extended or adjusted under 35 U.S.C. 154(b) by 155 days.

(21) Appl. No.: 13/995,950

(22) PCT Filed: Jan. 2, 2012

(86) PCT No.: PCT/IB2012/050015
§ 371 (c)(1),
(2), (4) Date: Jun. 20, 2013

(87) PCT Pub. No.: WO2012/093349
PCT Pub. Date: Jul. 12, 2012

(65) Prior Publication Data
US 2013/0272260 A1    Oct. 17, 2013

Related U.S. Application Data

(63) Continuation-in-part of application No. 11/647,122, filed on Dec. 27, 2006, now Pat. No. 8,160,001, and a continuation-in-part of application No. 12/426,251, filed on Apr. 19, 2009, now abandoned, which is a
(Continued)

(51) Int. Cl.
*H04W 84/10* (2009.01)
*H04W 76/02* (2009.01)
(Continued)

(52) U.S. Cl.
CPC .............. *H04W 76/02* (2013.01); *H04W 16/14* (2013.01); *H04W 76/025* (2013.01); *H04W 36/28* (2013.01); *H04W 72/1215* (2013.01); *H04W 88/06* (2013.01)

(58) Field of Classification Search
CPC . H04W 64/006; H04W 64/003; H04W 5/005; H04W 5/0062; H04W 72/1215; H04W 72/1242; H04W 72/1205; H04W 88/06; H04W 72/04; H04W 72/12; H04W 72/02; H04W 36/28; H04W 76/025
See application file for complete search history.

(56) References Cited

U.S. PATENT DOCUMENTS 6,130,886 A    10/2000 Ketseoglou et al.
6,985,432 B1    1/2006 Hadad et al.
(Continued)

FOREIGN PATENT DOCUMENTS

WO    2010100558 A2    9/2010
WO    2012172476 A2    12/2012

OTHER PUBLICATIONS

International Application PCT/IB2012/050015 Search Report dated May 18, 2012.
(Continued)

*Primary Examiner* — Wutchung Chu
(74) *Attorney, Agent, or Firm* — D. Kligler I.P. Services Ltd.

(57) ABSTRACT

A method for communication in a wireless device (24) includes establishing a first connection with a base station (BS-28) of a long-range wireless data network, and a second connection on a Wireless Local Area Network (WLAN). A time interval (96) is selected in the wireless device for communicating over the second connection. In preparation for the selected time interval, the BS is caused to refrain from scheduling data transmission from the wireless device to the BS over the first connection during the time interval, by reporting to the BS prior to the time interval that no data is pending for transmission from the wireless device. The wireless device communicates over the second connection on the WLAN during the time interval.

18 Claims, 4 Drawing Sheets

Related U.S. Application Data continuation of application No. 11/638,629, filed on Dec. 12, 2006, now Pat. No. 7,542,728.

(60) Provisional application No. 61/430,193, filed on Jan. 6, 2011, provisional application No. 60/803,192, filed on May 25, 2006, provisional application No. 60/772,167, filed on Feb. 9, 2006.

(51) Int. Cl.
| | |
|---|---|
| *H04W 16/14* | (2009.01) |
| *H04W 36/28* | (2009.01) |
| *H04W 88/06* | (2009.01) |
| *H04W 72/12* | (2009.01) |

(56) References Cited

U.S. PATENT DOCUMENTS

| | | | |
|---|---|---|---|
| 7,133,646 | B1 | 11/2006 | Miao |
| 7,133,669 | B2 | 11/2006 | Nair et al. |
| 7,289,804 | B2 | 10/2007 | Kim |
| 7,363,051 | B2 | 4/2008 | Bridgelall |
| 7,406,296 | B2 | 7/2008 | Haartsen et al. |
| 7,430,421 | B2 | 9/2008 | Park |
| 7,542,728 | B2 | 6/2009 | Bitran et al. |
| 7,545,787 | B2 | 6/2009 | Bitran et al. |
| 7,567,820 | B2 | 7/2009 | Bitran |
| 7,688,784 | B2 * | 3/2010 | Bitran et al. ........... 370/329 |
| 7,822,436 | B2 | 10/2010 | Bitran |
| 7,881,252 | B2 | 2/2011 | Bitran |
| 7,904,112 | B2 | 3/2011 | Bitran et al. |
| 8,121,144 | B2 | 2/2012 | Bitran |
| 8,160,001 | B2 | 4/2012 | Bitran |
| 2002/0136233 | A1 | 9/2002 | Chen et al. |
| 2002/0181509 | A1 | 12/2002 | Mody et al. |
| 2003/0054788 | A1 | 3/2003 | Sugar et al. |
| 2003/0169824 | A1 | 9/2003 | Chayat |
| 2004/0029619 | A1 | 2/2004 | Liang et al. |
| 2004/0162106 | A1 | 8/2004 | Monroe et al. |
| 2005/0020299 | A1 | 1/2005 | Malone et al. |
| 2005/0025093 | A1 | 2/2005 | Yun et al. |
| 2005/0059347 | A1 | 3/2005 | Haartsen |
| 2005/0101261 | A1 | 5/2005 | Weinzweig et al. |
| 2005/0128990 | A1 | 6/2005 | Eom et al. |
| 2005/0195786 | A1 | 9/2005 | Shpak |
| 2006/0121946 | A1 | 6/2006 | Walton et al. |
| 2006/0198476 | A1 | 9/2006 | Palaskas et al. |
| 2006/0221917 | A1 | 10/2006 | McRae |
| 2007/0066359 | A1 | 3/2007 | Zhuang |
| 2007/0076649 | A1 | 4/2007 | Lin et al. |
| 2007/0104145 | A1 | 5/2007 | Jan |
| 2007/0124478 | A1 | 5/2007 | Abdelhamid et al. |
| 2007/0140256 | A1 | 6/2007 | Yaqub |
| 2007/0165594 | A1 | 7/2007 | Heinle et al. |
| 2007/0280096 | A1 | 12/2007 | Yanover et al. |
| 2008/0132180 | A1 | 6/2008 | Manicone |
| 2008/0167031 | A1 | 7/2008 | Sorber et al. |
| 2008/0205365 | A1 | 8/2008 | Russel et al. |
| 2008/0233875 | A1 | 9/2008 | Desai et al. |
| 2009/0054009 | A1 | 2/2009 | Yang et al. |
| 2009/0061849 | A1 * | 3/2009 | Yang ................ H04W 74/0816 455/426.1 |
| 2009/0081962 | A1 | 3/2009 | Sohrabi et al. |
| 2009/0083601 | A1 * | 3/2009 | Gorokhov et al. .......... 714/748 |
| 2009/0111500 | A1 | 4/2009 | Sudak et al. |
| 2009/0180451 | A1 * | 7/2009 | Alpert ................ H04W 72/1215 370/338 |
| 2009/0285167 | A1 | 11/2009 | Hirsch et al. |
| 2010/0034113 | A1 * | 2/2010 | Marinier et al. .......... 370/252 |
| 2010/0061326 | A1 * | 3/2010 | Lee ................ H04W 72/12 370/329 |
| 2010/0142504 | A1 * | 6/2010 | Bitran et al. ............. 370/338 |
| 2010/0150069 | A1 * | 6/2010 | Fang et al. ................ 370/328 |
| 2010/0255852 | A1 * | 10/2010 | Chen et al. ............... 455/450 |
| 2010/0309865 | A1 * | 12/2010 | Kimura ..................... 370/329 |
| 2010/0329236 | A1 * | 12/2010 | Sampath et al. .......... 370/350 |
| 2011/0032853 | A1 | 2/2011 | Moon et al. |
| 2011/0134746 | A1 * | 6/2011 | Liu et al. ................. 370/201 |
| 2011/0222523 | A1 * | 9/2011 | Fu ......................... H04W 48/10 370/338 |
| 2013/0223258 | A1 * | 8/2013 | Seo et al. ................. 370/252 |
| 2013/0223282 | A1 * | 8/2013 | Zhang ................. H04W 76/025 370/254 |
| 2013/0223391 | A1 * | 8/2013 | Koo .................... H04W 72/0406 370/329 |
| 2013/0242919 | A1 * | 9/2013 | Koo .................... H04W 72/082 370/329 |
| 2013/0243110 | A1 * | 9/2013 | Skov et al. ................ 375/267 |
| 2013/0265901 | A1 * | 10/2013 | Pedersen et al. ........... 370/252 |
| 2014/0031026 | A1 * | 1/2014 | Long .................... H04W 4/001 455/418 |

OTHER PUBLICATIONS

Philips Semiconductors, "How 802.11b/g WLAN and Bluetooth Can Play", White Paper, Koninklijke Philips Electronics N.V., 5 pages, Netherlands, 2005.

Texas Instruments Incorporated, "Wireless Performance Optimization Solutions: Bluetooth and 802.11 coexistence", 4 pages, USA, 2003.

Bluetooth, "Specification of the Bluetooth System: Master Table of Contents & Compliance Requirements: Core Package Version 2.0 + EDR", 131 pages, Nov. 4, 2004.

International Application PCT/IL2007/000147 Search Report dated Sep. 12, 2008.

Gesbert et al., "From Theory to Practice: An Overview of MIMO Space-Time Coded Wireless Systems", IEEE Journal on Selected Areas in Communications, vol. 21, No. 3, pp. 281-302, Apr. 2003.

IEEE Standard 802.16 for Local and metropolitan area networks, "Part 16: Air Interface for Fixed Broadband Wireless Access Systems", Revision of IEEE Standard 802.16-2001, IEEE Computer Society and IEE Microwave Theory and Techniques Society, 895 pages, Oct. 1, 2004.

IEEE Standard 802.16e-2005 for Local and metropolitan area networks, "Part 16: Air Interface for Fixed Broadband Wireless Access Systems; Amendment 2 and Corrigendum 1, Physical and Medium Access Control Layers for Combined Fixed and Mobile Operation in Licensed Bands", Amendment and Corrigendum to IEEE Standard 802.16-2004, IEEE Computer Society and IEE Microwave Theory and Techniques Society, 864 pages, Feb. 28, 2006.

IEEE Inc., "A compilation based on IEEE Standard 802.11-1999 (revision 2003) and its amendments", IEEE Wireless LAN Edition, IEEE Press, 706 pages, USA, 2003.

Tomchik J., "QFDD and QTDD: Proposed Draft Air Interface Specification", IEEE 802.20 Working Group on Mobile Broadband Wireless Access, Qualcomm, Inc., 624 pages, USA, Oct. 28, 2005.

Altair Semiconductor, "TRIMAX: Coexistence of WiMAX, Bluetooth and WLAN in converged handsets (Non NDS version)", White paper 0012, Revision 1.00, 12 pages, Jul. 2006.

International Application PCT/IB2012/052945 Search Report dated Oct. 9, 2012.

3GPP TS 36.321, "3rd Generation Partnership Project; Technical Specification Group Radio Access Network; Evolved Universal Terrestrial Radio Access (E-UTRA); Medium Access Control (MAC) protocol specification (Release 9)", V9.3.0, 48 pages, Jun. 2010.

3GPP TS 36.211, "Technical Specification 3rd Generation Partnership Project; Technical Specification Group Radio Access Network; Evolved Universal Terrestrial Radio Access (E-UTRA); Physical Channels and Modulation (Release 8)", V8.6.0, 83 pages, Mar. 2009.

3GPP TS 36.101, "Technical Specification 3rd Generation Partnership Project; Technical Specification Group Radio Access Network; Evolved Universal Terrestrial Radio Access (E-UTRA); User Equipment (UE) radio transmission and reception (Release 10)", 225 pages, Apr. 2011.

3GPP TS 36.213, "Technical Specification 3rd Generation Partnership Project; Technical Specification Group Radio Access Network; Evolved Universal Terrestrial Radio Access (E-UTRA); Physical layer procedures (Release 10)", V10.1.0, 115 pages, Mar. 2011.

(56) References Cited

OTHER PUBLICATIONS

IEEE Standard 802.11n, "IEEE Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications; Amendment 5: Enhancements for Higher Throughput", 536 pages, Oct. 29, 2009.

IEEE Standard 802.11-2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications", 1232 pages, Jun. 12, 2007.

JP Application # 2013-547944 Office Action dated Oct. 14, 2015.

Qualcomm Incorporated, "Types of TDM Solutions for LTE ISM Coexistence", 3GPP TSG-RAN WG2 Meeting #71-BIS, Xian, China, 7 pages, Oct. 11-15, 2010.

Qualcomm Incorporated, "Requirements on gap patterns for TDM solutions to LTE ISM coexistence scenarios", 3GPP TSG-RAN WG2 Meeting #71-BIS, Xian, China, 4 pages, Oct. 11-15, 2010.

Alcatel-Lucent, "TDM solution with dynamic patterns", TSG-RAN WG2#72, Jacksonville, USA, 2 pages, Nov. 15-19, 2010.

Qualcomm Incorporated, "Problem Scenarios and Proposed Solutions for In-device Coexistence", 3GPP TSG-RAN WG2 Meeting #71, Madrid, Spain, 3 pages, Aug. 23-27, 2010.

3GPP TR 36.816, "3rd Generation Partnership Project;Technical Specification Group Radio Access Networks;Evolved Universal Terrestrial Radio Access (E-UTRA); Study on signalling and procedure for interference avoidance for in-device coexistence", Release 10, version 1.0.0, 34 pages, Nov. 2010.

Mediatek, "Analysis in In-Device Coexistence Interference Avoidance", 3GPP TSG-RAN WG2 Meeting #71, Madrid, Spain, 10 pages, Aug. 23-27, 2010.

Qualcomm, 3GPP TSG-RAN WG2, "Short term TDM solutions for LTE and Bluetooth voice coexistence", 3GPP TSG-RAN WG2 Meeting #71-BIS, Xian, China, 4 pages, Oct. 11-15, 2010.

3GPP TS 23.203, "3rd Generation Partnership Project;Technical Specification Group Services and System Aspects; Policy and charging control architecture", Release 11, version 11.0.1, 137 pages, Jan. 2011.

* cited by examiner

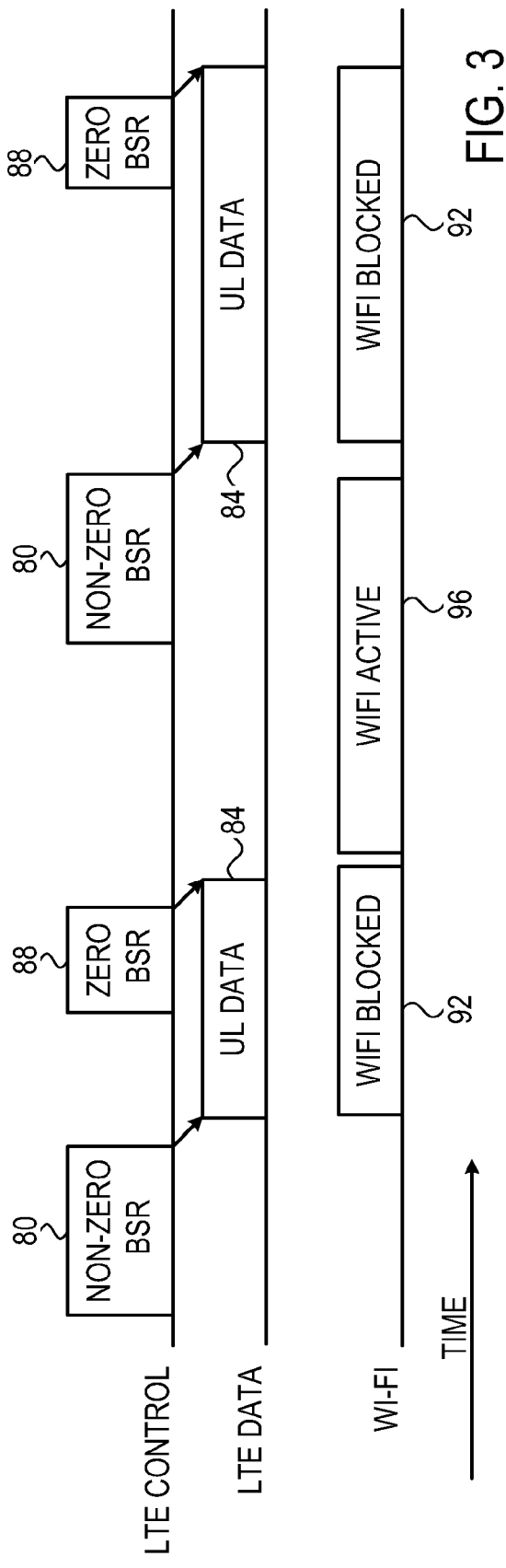
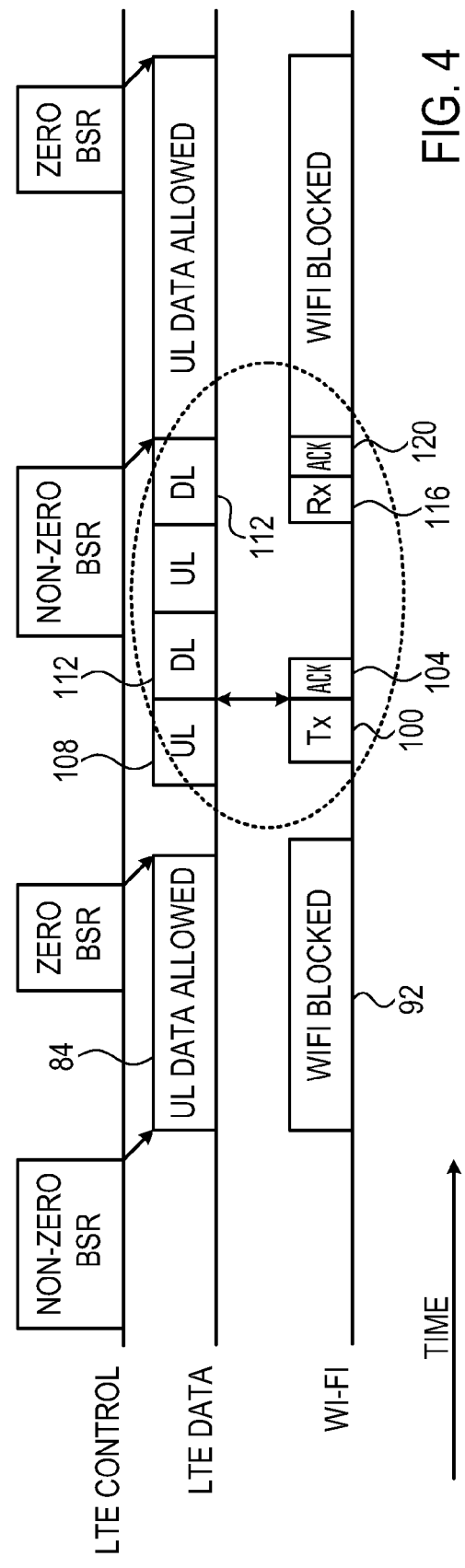

LTE/WI-FI COEXISTENCE

CROSS-REFERENCE TO RELATED APPLICATIONS

This application is a continuation in part of U.S. patent application Ser. No. 11/647,122, filed Dec. 27, 2006, and a continuation in part of U.S. patent application Ser. No. 12/426,251, filed Apr. 19, 2009, whose disclosures are incorporated herein by reference. This application claims the benefit of U.S. Provisional Patent Application 61/430,193, filed Jan. 6, 2011, whose disclosure is incorporated herein by reference.

FIELD OF THE INVENTION

The present invention relates generally to wireless communication, and particularly to coexistence between communication devices.

BACKGROUND OF THE INVENTION

In some communication systems, communication devices of different communication protocols operate in proximity to one another and in adjacent or overlapping frequency bands. Because of the proximity in location and frequency, such systems may be prone to interference.

Various techniques for coexistence between different communication protocols are known in the art. For example, U.S. Patent Application Publication 2007/0275746, whose disclosure is incorporated herein by reference, describes a communication method that includes establishing a first communication session over a first connection between a wireless terminal and a base station (BS) of a long-range wireless data network, which operates in accordance with a first protocol that defines a sequence of time frames. Based on the time frames defined by the BS, time slots are allocated for establishing a second communication session over a second connection between the wireless terminal and a peripheral wireless device, which operates in accordance with a second, short-range time-slotted communication protocol different from the first protocol. Time intervals are allocated within the time frames for communication between the BS and the wireless terminal over the first connection, such that the allocated time intervals are interleaved with and do not overlap the allocated time slots. The first and second communication sessions are concurrently conducted in the allocated time intervals and the assigned time slots, respectively.

U.S. Patent Application Publication 2009/0129367, whose disclosure is incorporated herein by reference, describes a method for communication that includes allocating time intervals for a first communication session over a first connection between a wireless terminal and a base station of a long-range wireless data network, which operates in accordance with a first protocol defining time frames having downlink and uplink sub-frames. Time slots are allocated for a second communication session over a second connection between the terminal and a peripheral wireless device, which operates in accordance with a second, short-range time-slotted protocol, which is different from the first protocol and has a retransmission mechanism. The time slots are synchronized with the downlink and uplink sub-frames defined by the BS. Operation of the second connection is inhibited during some of the time slots that overlap the downlink sub-frames, so as to invoke the retransmission mechanism and cause the terminal to transmit only during the time slots that do not overlap the downlink sub-frames.

U.S. Pat. No. 7,542,728, whose disclosure is incorporated herein by reference, describes Apparatus for communication that includes at least one RF receiver circuit, which is coupled to receive and down-convert first and second RF signals that are transmitted respectively over different, first and second wireless networks in accordance with different, first and second network protocols, so as to output first and second down-converted signals. A baseband processing circuit includes processing components that are coupled to receive and process the first and second down-converted signals so as to extract first and second data from the signals. The processing components have a first configuration for demodulating the first down-converted signals in accordance with the first network protocol and a second configuration for demodulating the second down-converted signals in accordance with the second network protocol.

U.S. Pat. No. 7,545,787 and U.S. Patent Application Publication 2010/0142504, whose disclosures are incorporated herein by reference, describe a method for communication that includes establishing a first connection between a wireless terminal and a base station of a long-range wireless data network, which operates in accordance with a first protocol that defines a sequence of time frames for transmission of data between the wireless terminal and the base station. A signal is sent from the wireless terminal to the base station identifying an interval including one or more of the time frames during which the wireless terminal will not receive data from the base station. During the interval, a second connection is established between the wireless terminal and an access point of a wireless local area network (WLAN) in accordance with a second protocol, different from the first protocol.

SUMMARY OF THE INVENTION

An embodiment of the present invention that is described herein provides a method for communication in a wireless device. The method includes establishing a first connection with a base station (BS) of a long-range wireless data network, and a second connection on a Wireless Local Area Network (WLAN). A time interval is selected in the wireless device for communicating over the second connection. In preparation for the selected time interval, the BS is caused to refrain from scheduling data transmission from the wireless device to the BS over the first connection during the time interval, by reporting to the BS prior to the time interval that no data is pending for transmission from the wireless device. The wireless device communicates over the second connection on the WLAN during the time interval.

In some embodiments, reporting that no data is pending is performed even when some data is pending for transmission to the BS, so as to cause the BS to schedule transmission of the pending data outside the time interval. In an embodiment, the method includes, in preparation for an end of the time interval, reporting to the BS that data is pending for transmission from the wireless device. Reporting that the data is pending may include reporting an amount of the data that is different from an actual size of the pending data, so as to control a size of the scheduled transmission.

In another embodiment, the long-range wireless data network operates in accordance with a Long Term Evolution (LTE) specification, and reporting that no data is pending includes sending a Buffer status Report (BSR) message. In yet another embodiment, the method includes applying a communication pattern that alternates between the first and second connections, by alternately reporting to the BS that data is pending and that no data is pending. In still another embodiment, the method includes inhibiting communication over the second connection prior to and following the selected time interval. Reporting to the BS may include sending to the BS a reporting message at a time that takes into account a scheduling latency of the first connection.

There is additionally provided, in accordance with an embodiment of the present invention, a wireless device including a Radio Frequency (RF) front end and baseband circuitry. The RF front end is configured to exchange RF signals so as to communicate on a long-range wireless data network and on a Wireless Local Area Network (WLAN). the baseband circuitry is configured to establish, via the RF front end, a first connection with the BS of the long-range wireless data network and a second connection on the WLAN, to select a time interval for communicating over the second connection, to cause the BS, in preparation for the selected time interval, to refrain from scheduling data transmission from the wireless device to the BS over the first connection during the time interval by reporting to the BS prior to the time interval that no data is pending for transmission from the wireless device, and to communicate using the wireless device over the second connection on the WLAN during the time interval.

There is also provided, in accordance with an embodiment of the present invention, a method for communication in a wireless device. The method includes establishing a first connection with a base station (BS) of a long-range wireless data network in an interleaved sequence of uplink intervals, for transmitting to the BS, and downlink intervals, for receiving from the BS. Concurrently with the first connection, a second connection is established in the wireless device with a station of a Wireless Local Area Network (WLAN) that is located in close proximity to the wireless device. Interference from transmission of the station on the second connection to reception of the BS on the first connection is prevented, by transmitting signals from the wireless device to the station so as to block the station from transmitting during the downlink time intervals.

In some embodiments, preventing the interference includes blocking the wireless device from transmitting to the station on the second connection so as to prevent the station from transmitting acknowledgement messages to the wireless device during the downlink time intervals. In an embodiment, preventing the interference includes sending to the station a CTS-to-self message. In a disclosed embodiment, preventing the interference includes scheduling transmissions from the wireless device to the station such that respective acknowledgements from the station occur during the uplink intervals of the first connection. Scheduling the transmissions may include setting respective parameters of the transmissions such that the acknowledgements occur during the uplink intervals. The parameters may include durations and/or start times of the transmissions.

In another embodiment, preventing the interference includes communicating with the station using a Modulation and Coding Scheme (MCS) that is selected such that the transmission of the station fits outside the downlink intervals. The method may include transmitting to the station using a Modulation and Coding Scheme (MCS) that is selected to account for the interference from the transmission of the wireless device over the first connection to the reception of the station over the second connection.

In an embodiment, the method includes transmitting acknowledgement messages to the station at a power level that is lower than a normal power level used for data transmission to the station, and setting a Modulation and Coding Scheme (MCS) of the acknowledgement messages to match the power level. In another embodiment, preventing the interference includes transmitting the signals at a power level that is selected so as to block the station but refrain from blocking other stations that are not in close proximity to the wireless device. In yet another embodiment, preventing the interference includes synchronizing in the wireless device a time base of the second connection to a frame time base of the first connection.

There is further provided, in accordance with an embodiment of the present invention a wireless device including a Radio Frequency (RF) front end and baseband circuitry. The RF front end is configured to exchange RF signals so as to communicate long-range wireless data network and on a Wireless Local Area Network (WLAN). The baseband circuitry is configured to establish, via the RF front end, a first connection with a base station (BS) of the long-range wireless data network in an interleaved sequence of uplink intervals, for transmitting to the BS, and downlink intervals, for receiving from the BS, to establish, concurrently with the first connection, a second connection with a station of the WLAN that is located in close proximity to the wireless device, and to prevent interference from transmission of the station on the second connection to reception of the BS on the first connection, by transmitting signals from the wireless device to the station so as to block the station from transmitting during the downlink time intervals.

There is moreover provided, in accordance with an embodiment of the present invention, a method for communication in a wireless device. The method includes establishing a first connection with a base station (BS) of a long-range wireless data network, and, concurrently with the first connection, a second connection on a Wireless Local Area Network (WLAN), and communicating with the BS over the first connection in a mode that predefines a pattern of activity periods and inactivity periods. Transmissions over the second connection are configured based on the pattern of the activity and inactivity periods predefined for the first connection, so as to reduce interference between the first and second connections.

In some embodiments, the first connection operates in accordance with a Long Term Evolution (LTE) specification, and the mode includes Semi-Persistent Scheduling (SPS) and/or Discontinuous Reception (DRX). In an embodiment, configuring the transmissions includes preventing the transmissions over the second connection from occurring during the activity periods of the first connection. In another embodiment, configuring the transmissions includes controlling the transmissions of the wireless device over the second connection.

In a disclosed embodiment, configuring the transmissions includes controlling the transmissions of an opposite endpoint with which the wireless device communicates over the second connection. In another embodiment, configuring the transmissions includes controlling the transmissions based on an identification of the activity periods that are assigned for uplink transmission and the activity periods that are assigned for downlink transmission, power levels to be used for the transmissions, and/or signal types to be used for the transmissions. Configuring the transmissions may include synchronizing in the wireless device a time base of the second connection to a frame time base of the first connection.

There is additionally provided, in accordance with an embodiment of the present invention, a wireless device including a Radio Frequency (RF) front end and baseband circuitry. The RF front end is configured to exchange RF signals so as to communicate on a long-range wireless data network and on a Wireless Local Area Network (WLAN). The baseband circuitry is configured to establish, via the RF front end, a first connection with a base station (BS) of the long-range wireless data network and, concurrently with the first connection, a second connection on the WLAN, to communicate with the BS over the first connection in a mode that predefines a pattern of activity periods and inactivity periods, and to configure transmissions over the second connection based on the pattern of the activity and inactivity periods predefined for the first connection, so as to reduce interference between the first and second connections.

The present invention will be more fully understood from the following detailed description of the embodiments thereof, taken together with the drawings in which:

BRIEF DESCRIPTION OF THE DRAWINGS

FIGS. 3 and 4 are diagrams showing timing of LTE and Wi-Fi transmissions, in accordance with embodiments of the present invention;

DETAILED DESCRIPTION OF EMBODIMENTS

Overview

Figure 1:
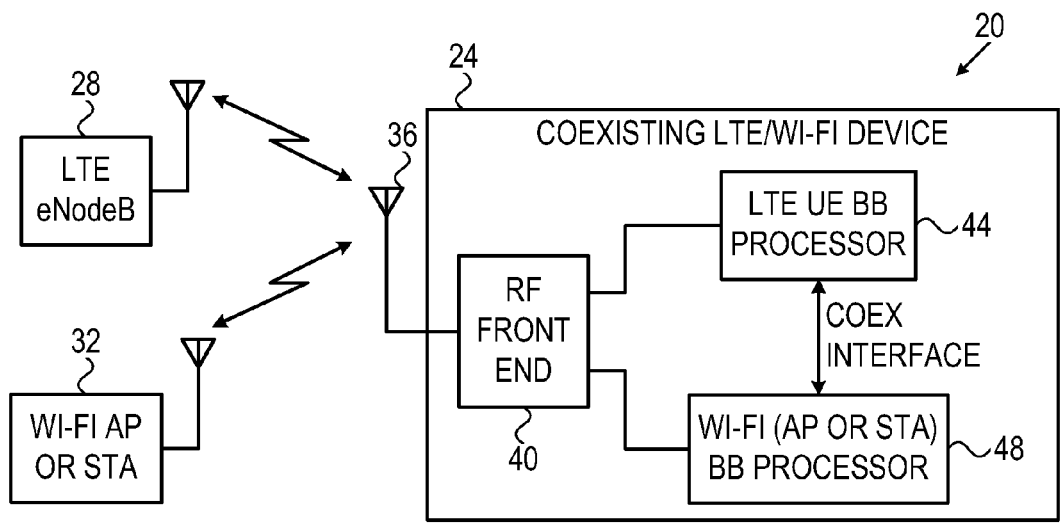
FIG. 1 is a block diagram that schematically illustrates an LTE/Wi-Fi communication system, in accordance with an embodiment of the present invention.

Some communication devices communicate simultaneously on a long-range data network (e.g., a Long Term Evolution—LTE network) and on a Wireless Local Area Network (WLAN). In practice, transmission on one network may cause interference to reception on the other, especially when the transmitter and receiver are collocated and when the two networks operate in overlapping or adjacent frequency bands.

Embodiments of the present invention that are described herein provide improved methods and systems for coexistence, which help to reduce or eliminate such interference. Although the embodiments described herein refer mainly to LTE and WLAN (also referred to as Wi-Fi), the disclosed techniques are similarly applicable to other suitable network types.

In some disclosed embodiments, a wireless device communicates with an LTE base station (BS) and simultaneously with a WLAN station (STA) or Access Point (AP). In accordance with the LTE specifications, the BS schedules uplink transmissions from the wireless device in response to Buffer Status Report (BSR) messages in which the wireless device reports the amount of data that is pending for transmission. The wireless device exploits the BSR mechanism to create time intervals that are free of LTE uplink transmissions, and can therefore be used for Wi-Fi communication without interference.

In some embodiments, the wireless device selects a time interval to be used for Wi-Fi communication. In preparation for the selected time interval, the wireless device causes the time interval to be free of LTE uplink transmission by sending to the BS a BSR of zero, i.e., reporting to the BS that no data is pending. Upon receiving a BSR=0 message, the BS will not schedule any uplink data transmissions from the wireless device until receiving a non-zero BSR. Thus, the wireless device uses the time interval following the BSR=0 message for Wi-Fi communication without risk of LTE interference.

In other disclosed embodiments, the wireless device communicates with the LTE BS in Time Division (TD) LTE mode, in an interleaved sequence of uplink and downlink intervals. At the same time, the wireless device communicates with a Wi-Fi STA that is located in close proximity to the device. Because of the close proximity, out-of-band emissions from the Wi-Fi transmitter of the STA that fall in the LTE band may cause interference to the LTE reception. In some embodiments, the wireless device prevents this interference by transmitting to the nearby STA signals so as to block the STA from transmitting during the downlink time intervals.

In other disclosed embodiments, the wireless device is configured by the LTE BS to communicate in a sparse pattern of activity periods (e.g., LTE sub-frames) separated by inactivity periods. For example, the wireless device may be configured to operate in a Semi-Persistent Scheduling (SPS) mode and/or a Discontinuous Reception (DRX) mode, both defined in the LTE specifications. In some embodiments, the wireless device adapts the communication on the WLAN based on the LTE activity/inactivity pattern, so as to reduce interference.

System Description

FIG. 1 is a block diagram that schematically illustrates an LTE/Wi-Fi communication system 20, in accordance with an embodiment of the present invention. System 20 comprises a communication device 24, which communicates concurrently over both a long-range data network and over a Wireless Local Area Network (WLAN).

In the present example, the long-range data network operates in accordance with the Third Generation Partnership Project (3GPP) Long Term Evolution (LTE) specifications. LTE, also referred to as Evolved Universal Terrestrial Radio Access (E-UTRA), is specified, for example, in 3GPP Technical Specification TS 36.300, entitled "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," version 9.6.0, December, 2010, which is incorporated herein by reference. In the context of the present patent application and in the claims, the term "LTE specification" refers collectively to any specification or standard that defines LTE communication, including variants and extensions of the above-cited specification. In alternative embodiments, the long-range data network may operate in accordance with any other suitable present or future specification or protocol The WLAN in the present example operates in accordance with the IEEE 802.11 standards. For example, WLAN operation in the 2.4 GHz frequency range is specified in IEEE Standard 802.11-2007, entitled "IEEE Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications," Jun. 12, 2007, which is incorporated herein by reference. WLAN is also referred to as Wi-Fi. In the context of the present patent application and in the claims, the terms "WLAN" and "Wi-Fi" are used to refer collectively to the original IEEE 802.11 standard and all its variants and extensions (e.g., IEEE 802.11n-2009), as well as to any other suitable WLAN type.

In the embodiment of FIG. 1, device 24 communicates with an LTE base station (BS) 28, also referred to as eNodeB. Thus, device 24 functions as an LTE User Equipment (UE). On the Wi-Fi network, in some embodiments device 24 functions as a Wi-Fi station (STA) and in other embodiments as a Wi-Fi Access Point (AP). Thus, device 24 communicates over the WLAN with a Wi-Fi STA or AP 32. Device 24 may be embodied, for example, in a multi-mode communication device such as a smart-phone, in a portable router, in a fixed router or in any other suitable device.

In various embodiments, LTE and Wi-Fi communication are performed in adjacent frequency bands. In one example embodiment, device 24 operates in accordance with LTE Frequency Division Duplex (FDD) in band 7, in which the uplink (UL) is transmitted in the 2500-2570 MHz range and downlink (DL) is transmitted in the 2620-2690 MHz range, and on the Wi-Fi network in the 2400-2480 MHz range. Alternatively, other operation modes (e.g., Time Division Duplex—TDD) and frequency bands can also be used. Because of the proximity in location and frequency, operation in one network may suffer from interference from the other network. As will be explained in detail below, device 24 applies coexistence schemes that reduce or eliminate such interference. When using these techniques, device 24 is able to conduct simultaneous LTE and Wi-Fi communication sessions with little or no performance degradation on either network.

Although the embodiments described herein refer mainly to a single communication device having both LTE and Wi-Fi capabilities, some of the disclosed techniques are similarly applicable to separate but nearby LTE and Wi-Fi devices that suffer from interference.

In the embodiment of FIG. 1, device 24 comprises an antenna 36 and a Radio Frequency (RF) front end 40, using which device 24 exchanges RF signals with BS 28 and AP or STA 32 so as to communicate on the LTE and Wi-Fi networks. An LTE baseband (BB) processor 44 carries out the LTE UE processing functions of the device. A Wi-Fi BB processor 48 carries out the Wi-Fi (STA or AP) processing functions of the device.

In some embodiments, the LTE and Wi-Fi BB processors communicate with one another over a coexistence interface, for exchanging information that assists in coordinating the LTE/Wi-Fi coexistence. Front end 40 is shared between the LTE and Wi-Fi, i.e., carries out transmission and reception on both the LTE and Wi-Fi networks. The RF front end may comprise suitable filters that mitigate or reduce some of the LTE/Wi-Fi interference.

The configuration of device 24 shown in FIG. 1 is an example configuration, which is chosen purely for the sake of conceptual clarity. In alternative embodiments, any other suitable device configuration can be used. For example, LTE and Wi-Fi communication may be carried out via separate RF front-end and antennas. As another example, the functions of BB processors 44 and 48 may be carried out by a single BB processor. In the present context, BB processors 44 and 48 are referred to collectively as baseband circuitry that carries out the disclosed techniques. Certain elements of device 24 may be implemented using hardware, such as using one or more Application-Specific Integrated Circuits (ASICs) or Field-Programmable Gate Arrays (FPGAs). Alternatively, some elements of device 24 may be implemented in software or using a combination of hardware and software elements.

In some embodiments, functions of device 24 may be implemented using a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Coexistence Using Buffer Status Report (BSR)

In some embodiments, device 24 creates time intervals that are free of LTE uplink transmission (from the device to BS 28) by exploiting the Buffer Status Report (BSR) messages defined in LTE. These time intervals can then be used for Wi-Fi communication, without the risk of LTE transmission from device 24 affecting Wi-Fi reception in the device.

The BSR mechanism is defined in section 11.3 of 3GPP TS 36.300, cited above, as well as in section 5.4.5 of 3GPP TS 36.321, entitled "Technical Specification Group Radio Access Network; Evolved Universal Terrestrial Radio Access (E-UTRA); Medium Access Control (MAC) protocol specification (Release 9)," version 9.3.0, June, 2010, which is incorporated herein by reference. According to this definition, the LTE UE uses BSR messages to report to the BS the amount of data that is buffered in its transmission buffer and is pending for transmission. A BSR of zero indicates that no data is pending. The LTE BS schedules uplink transmissions of the various UEs based on the BSR messages they send. In particular, if a particular UE reports BSR=0, the BS will not schedule uplink data transmission for this UE until receiving a subsequent non-zero BSR.

In some embodiments, BB processor 44 in device 24 selects a time interval for communicating over the Wi-Fi network. In preparation for the selected time interval, BB processor 44 ensures that the time interval is free of LTE uplink transmission by transmitting a BSR=0 message (indicating that no data is pending for transmission to the BS) to BS 28 prior to the interval. BB processor 44 transmits a non-zero BSR message (indicating that a certain amount of data is pending) towards the end of the interval. In response to receiving the BSR=0 message, BS 28 will refrain from scheduling LTE uplink transmission from device 24. The BS will schedule LTE uplink transmission after receiving the non-zero BSR message.

In this manner, BB processor 44 may cause system 20 to operate in a pattern that alternates between time intervals intended for LTE uplink transmission and time intervals that are free of LTE uplink transmission (and are therefore usable for Wi-Fi communication).

Figure 2:
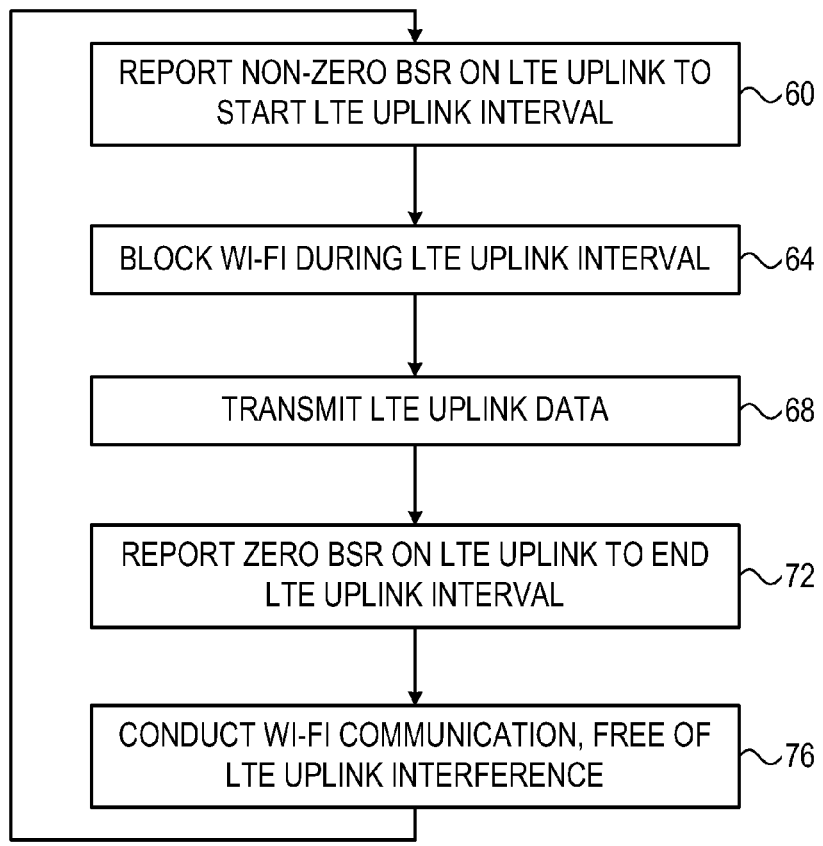
FIG. 2 is a flow chart that schematically illustrates a method for LTE/Wi-Fi coexistence, in accordance with an embodiment of the present invention.

FIG. 2 is a flow chart that schematically illustrates a method for LTE/Wi-Fi coexistence, in accordance with an embodiment of the present invention. The method begins with BB processor 44 transmitting to BS 28 a BSR message that reports a non-zero BSR, at a non-zero BSR step 60.

In some embodiments, device 24 blocks Wi-Fi communication during the time interval that will be used for LTE uplink transmission, at a Wi-Fi blocking step 64. For example, BB processor 44 may cause BB processor 48 to inhibit Wi-Fi communication by sending an appropriate indication over the coexistence interface.

Upon receiving the non-zero BSR, BS 28 schedules an uplink transmission from device 24. Using this allocation, BB processor 44 transmits the pending data to BS 28 during the time interval in question, at an LTE uplink transmission step 68.

At the end of the LTE uplink interval, BB processor 44 sends to BS 28 a message that reports zero BSR, i.e., that no data is pending in the transmit buffer, at a zero BSR step 72. In response to the zero BSR message, BS 28 refrains from scheduling LTE uplink transmission from device 24. Thus, BB processor 48 communicates with STA or AP 32 over the Wi-Fi network, at a Wi-Fi communication step 76, without risk of interference from LTE uplink transmission.

The method then loops back to step 60 above for scheduling another LTE uplink interval. Using this technique, device 24 may enforce an alternating pattern of LTE uplink intervals and intervals that are free of LTE uplink transmission.

When using this method, at least in some scenarios, device 24 may report zero BSR even though some data is pending in its transmission buffer. This sort of reporting causes the BS to schedule transmission of this data on the LTE uplink only after receiving a later non-zero BSR. In other words, this technique enables device 24 to postpone the transmission of the uplink data until the end of the time interval.

Typically, there is certain latency between the transmission of a non-zero BSR message from device 24 and the scheduling of an uplink transmission by BS 28. This latency is caused by the LTE protocol, and its size may be on the order of 10 ms. Typically, BB processor 44 takes this latency into account when setting the timing of the time intervals. In some embodiments, BB processor 44 sets the size and/or duty cycle of the time intervals while considering the actual throughput on the LTE connection from device 24 to BS 28. These parameters can be set, for example, by setting the reported BSR value (the reported amount of pending data).

Consider, for example, an average uplink throughput of 10 Mbps (=10 Kbit/ms), and assume the desired active time (the length of each LTE uplink interval) is 10 ms. In such a case, sending a BSR message that reports 100 kb of pending data will cause the BS to schedule an uplink transmission of approximately 10 ms. Thus, at least in some cases, the amount of data that device 24 reports in the non-zero BSR message is different from the actual amount of data that is pending for transmission.

FIG. 3 is a diagram showing timing of LTE and Wi-Fi transmissions, in accordance with an embodiment of the present invention. The example of FIG. 3 shows how device 24 creates time intervals for LTE uplink and time intervals that are free of LTE uplink transmission using the above-described BSR mechanism.

The top of FIG. 3 shows the LTE control messaging, and in particular non-zero BSR messages 80 and zero BSR messages 88 that are sent from device 24 to BS 28. The middle of FIG. 3 shows the timing of LTE uplink data transmission. BS 28 schedules an LTE uplink transmission 84 at a certain latency (e.g., 10 ms) following each non-zero BSR 80. The bottom of FIG. 3 shows the time periods of Wi-Fi activity. In particular, Wi-Fi activity is blocked during blocked intervals 92 (corresponding to LTE uplink transmissions 84) so as to avoid interference from the LTE uplink transmissions.

Device 24 sends a zero BSR message 88 to BS 28 towards the end of the LTE uplink transmission. Following the zero BSR message, the BS will not schedule LTE uplink transmissions until the next non-zero BSR message 88. Thus, these BSR messages form a Wi-Fi activity period 96 in which device 24 may communicate on the Wi-Fi network without interference from the LTE uplink.

In one example embodiment, each uplink data transmission 84 is 20 ms long, and each Wi-Fi activity period 96 is 15 ms long. Alternatively, however, any other suitable lengths can be used.

LTE BB processor 44 may block Wi-Fi communication during intervals 92 in various ways. In one embodiment, LTE BB processor 44 informs Wi-Fi BB processor 48 of the timing of intervals 92 explicitly, using the coexistence interface between the BB processors. The Wi-Fi BB processor may inhibit Wi-Fi communication during intervals 92 in any suitable manner, for example by setting a Not-Available (NAV) interval using a process known as "CTS-to-self" that ends at the end of intervals 84.

In alternative embodiments (e.g., when the LTE and Wi-Fi BB processors are in separate devices and/or are not connected by a coexistence interface), LTE BB processor 44 does not inform Wi-Fi BB processor 48 of the timing of intervals 92. In these embodiments, Wi-Fi downlink reception during intervals 92 may suffer from interference from LTE uplink transmission. The level of interference may vary depending on, for example, filtering quality in the RF front end, isolation between LTE and Wi-Fi antennas in device 24, transmit power and other RF parameters of the LTE transmitter, RF parameters of the Wi-Fi receiver and Wi-Fi modem quality. In case of severe interference, Wi-Fi packets may be dropped and retransmitted until they are received successfully (either in interval 92 or in the subsequent interference-free interval 84).

The BSR-based coexistence technique can be implemented in various ways in device 24. In some embodiments, the BSR coexistence scheme is carried out by LTE BB processor 44. This implementation may be advantageous since the LTE BB processor, which runs the LTE protocol stack, already possesses the necessary information regarding the transmit buffer status. Moreover, the LTE BB processor may possess valuable information regarding the BS behavior, for example the BS latency in reacting to a non-zero BSR. This sort of information can be used for optimizing the coexistence scheme.

In alternative embodiments, the BSR-based coexistence scheme is implemented in another processor external to LTE BB processor 44. In one example, the coexistence scheme may be implemented in Wi-Fi BB processor 48 in case of a Wi-Fi AP. In these embodiments, control of the BSR is indirect, by the other processor controlling the rate of the information provided to LTE BB processor 44. Typically in this implementation, the other processor should receive explicit information regarding the average LTE uplink throughput, or it should implicitly estimate this throughput by examining the outgoing packets. Such an implementation may be advantageous, for example since it does not require modification of existing LTE BB processor or other LTE UE elements.

Regardless of implementation, the size of the LTE transmission buffer in device 24 should be sufficiently large to hold the uplink packets, to support the time durations in which the LTE uplink is inactive.

The BSR-based scheme described above assumes that the major source of interference in device 24 is from the LTE uplink transmission to the reception of Wi-Fi downlink transmissions. Interference in the opposite direction, i.e., from the Wi-Fi uplink to the reception of LTE downlink transmissions, is assumed to be tolerable or mitigated in other ways (e.g., using sufficient filtering in RF front end 40).

In some embodiments, following a zero BSR message, BS 28 will not schedule data transmissions on the LTE uplink, but may schedule control-related uplink transmissions. These control-related transmissions are less likely to cause interference to the Wi-Fi downlink because their output power is typically lower than that of the data transmissions. In some embodiments it may be possible to occasionally avoid transmission of control-related transmissions, depending on the expected level of interference.

BSR-Based Coexistence for TD LTE UE Collocated with Wi-Fi Access Point

FIG. 4 is a diagram showing timing of LTE and Wi-Fi transmissions, in accordance with an embodiment of the present invention. In this embodiment, the LTE communication of LTE BB processor 44 is in accordance with LTE Time Division (TD), and Wi-Fi BB processor 48 functions as a Wi-Fi AP. In the present example each LTE TD downlink frame and each LTE TD uplink frame is 2.5 ms long, although any other suitable frame sizes can also be used.

During Wi-Fi blockage intervals 92, BB processor 48 inhibits the Wi-Fi communication as explained above. LTE communication during these intervals (corresponding to intervals 84) may be performed in both uplink and downlink directions.

Between intervals 92 (i.e., during Wi-Fi activity periods), no interference is caused to the Wi-Fi reception by LTE uplink transmissions 108, because of the above-described BSR-based mechanism. Interference may occur, however, during LTE downlink transmissions 112. (In FDD scenarios, the assumption is that FDD Band 7 is used. In this band the downlink frequencies have a relatively large separation from the Wi-Fi frequencies, and front-end isolation is assumed sufficient for preventing interference in intervals 96.)

Since the Wi-Fi AP in this embodiment is collocated with the LTE UE, this interference can be reduced. In some embodiments, the Wi-Fi AP (BB processor 48 in this example) is aware of and synchronized to the TD LTE frame timing. Wi-Fi AP transmissions 100 are synchronized to LTE uplink intervals 108. For this purpose, the Wi-Fi AP (BB processor 48) is typically aware of the start times and durations of LTE uplink intervals 108, and modifies the Wi-Fi data size to fit in these intervals (for example by fragmenting the packets).

Additionally, in some embodiments, the end of each Wi-Fi AP transmission 100 is aligned to the end of an LTE uplink interval 108. This alignment causes each Wi-Fi acknowledgement (ACK) 104 (sent from Wi-Fi STA 32 to the Wi-Fi AP in device 24) to be received during an LTE downlink interval 112.

The Wi-Fi receiver in device 24 may be allowed to operate during LTE downlink intervals 112. When a Wi-Fi burst 116 is received, the Wi-Fi AP in device 24 should transmit an ACK burst 120. The transmitted ACK burst may interfere with the reception of LTE downlink. In some embodiments, the Wi-Fi AP in device 24 (BB processor 48) overcomes this problem by transmitting ACK 120 at a lower output power, and possibly at a lower (more robust) Modulation and Coding Scheme (MCS).

Additionally or alternatively, LTE BB processor 44 may mitigate the interference caused by ACK 120 as part of the LTE downlink reception. Such mitigation is possible, for example, since the ACK waveform and associated parameters are known to device 24, and the duration of ACK 120 is relatively short. The LTE receiver in this embodiment is notified in advance of the parameters of the ACK waveform and cancels this known interference in its demodulation/decoding process.

In alternative embodiments, the LTE TD frame pattern includes finite gaps between uplink intervals 108 and downlink intervals 112. These gaps can be used for transmitting Wi-Fi ACK messages from the Wi-Fi AP in device 24 without causing interference.

Figure 5:
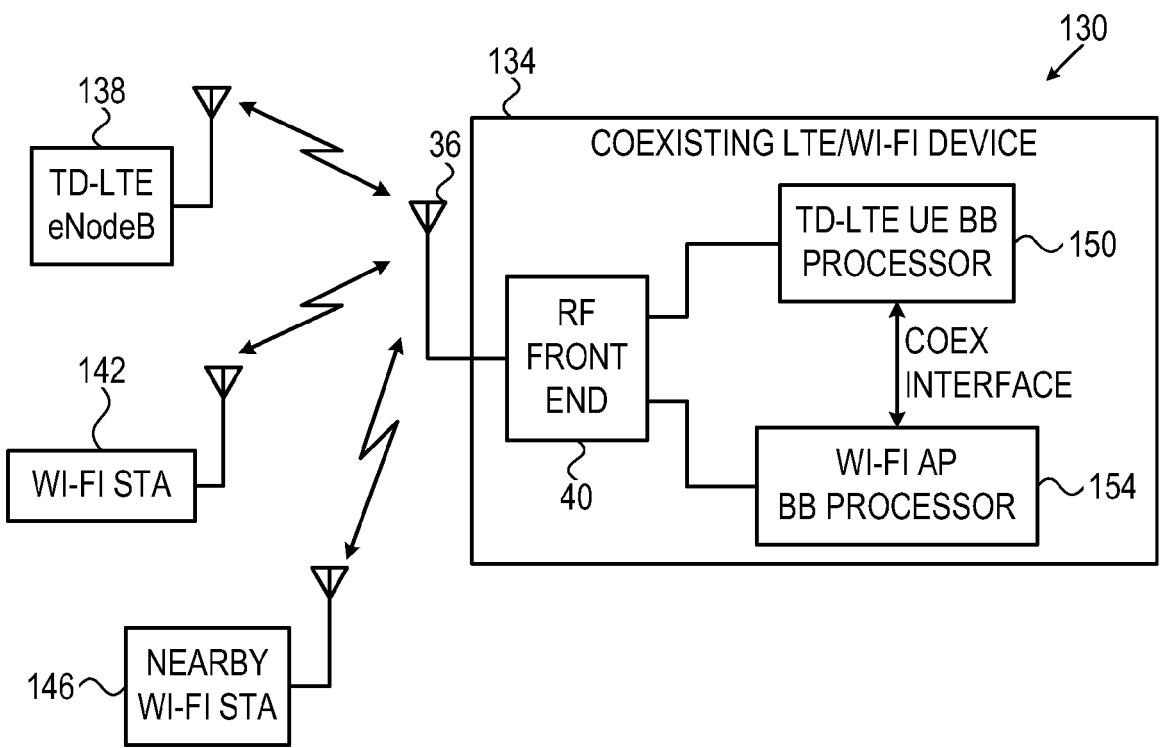
FIG. 5 is a block diagram that schematically illustrates an LTE/Wi-Fi communication system, in accordance with another embodiment of the present invention.

Coexistence Between Collocated TD-LTE UE and Wi-Fi AP, and a Nearby Wi-Fi Station FIG. 5 is a block diagram that schematically illustrates an LTE/Wi-Fi communication system 130, in accordance with another embodiment of the present invention. In system 130, a communication device 134 communicates simultaneously with an LTE BS (eNodeB) 138 using TD-LTE and with one or more Wi-Fi STAs using Wi-Fi. In the present example, device 134 communicates with a distant STA 142 and a nearby STA 146.

Device 134 may be embodied, for example, in a portable router or in a smart-phone having LTE and Wi-Fi AP functionality. Although the embodiments described herein refer to LTE and Wi-Fi, the disclosed techniques are similarly applicable to other long-range data networks or WLANs, as described with respect to FIG. 1 above.

Device 134 comprises antenna 35 and RF front end 40, similarly to device 24 of FIG. 1 above. Device 134 comprises a LTE BB processor 150 that functions as a TD-LTE UE, and a Wi-Fi BB processor 154 that functions as a Wi-Fi AP. In some embodiment BB processors 150 and 154 communicate with one another over a coexistence interface.

In the present embodiment, STA 146 is located in close proximity to device 134, e.g., at a distance of less than 1 m. In the present context, the term "close proximity" refers to a distance at which the LTE receiver in device 134 suffers from interference from the Wi-Fi transmitter of STA 146 even though there is no frequency overlap between them. For example, STA 146 may transmit out-of-band spurious signals or noise that fall in the LTE band and may cause interference at close proximity.

STA 146 may comprise, for example, a netbook, a smart-phone, a tablet computer, a laptop computer or any other suitable type of Wi-Fi station. Because of the close proximity of STA 146 to device 134, interference may be caused to Wi-Fi and LTE reception in device 134, as well as to Wi-Fi reception in the nearby Wi-Fi STA 146. The description that follows provides example coexistence schemes for mitigating this interference.

The disclosed techniques focus on protocol-level coordination between BB processors 150 and 154 (i.e., between the collocated TD-LTE UE and Wi-Fi AP in device 134) for reducing interference to and from the nearby Wi-Fi STA 146. The underlying assumption is that STA 146 is not necessarily designed for coexistence, e.g., with respect to receiver linearity and transmitter emissions. The collocated TD-LTE UE and Wi-Fi AP in device 134 are assumed to coexist, e.g., using sufficient filtering in RF front end 40. This filtering is assumed to overcome the interference from LTE transmissions of BB processor 150 to Wi-Fi reception of BB processor 154, and from Wi-Fi transmissions of BB processor 154 to LTE reception of BB processor 150.

In such a configuration, several different modes of interference may occur, as summarized in the table below:

| LTE UE (150) state | Wi-Fi AP (154) state | Nearby Wi-Fi STA (146) state | Interference description |
|---|---|---|---|
| UL-TX | TX | RX | Some interference to WiFi STA 146, but reception still possible with acceptable quality when TX power difference between the two transmitters is not too large. |
| UL-TX | RX | TX | No interference—RX of AP 154 is protected by RF front end. |

-continued

| LTE UE (150) state | Wi-Fi AP (154) state | Nearby Wi-Fi STA (146) state | Interference description |
|---|---|---|---|
| UL-TX | Listen | Listen | STA clear Channel Assessment (CCA) may be activated due to unfiltered LTE UE transmitter, thus STA 146 may not be able to start new transmissions. |
| DL-RX | TX | RX | No interference—RX of LTE UE 150 is protected by RF front end. |
| DL-RX | RX | TX | Interference from Wi-Fi STA 146 due to potentially high noise emission level in LTE band. |
| DL-RX | Listen | Listen | No transmissions—No interference |

As can be seen from the table, the dominant form of interference is from Wi-Fi transmissions of STA 146 to LTE reception at device 134.

Since the distance between STA 146 and the Wi-Fi AP in device 134 is small, STA 146 may transmit on the Wi-Fi channel with a high Modulation and Coding Scheme (MCS) and thus the burst durations of the Wi-Fi transmissions are relatively short. In some embodiments this feature enables fitting the Wi-Fi bursts transmitted by STA 146 within the (relatively short) LTE UL and DL intervals (typically on the order of 2.5 ms).

Figure 6:
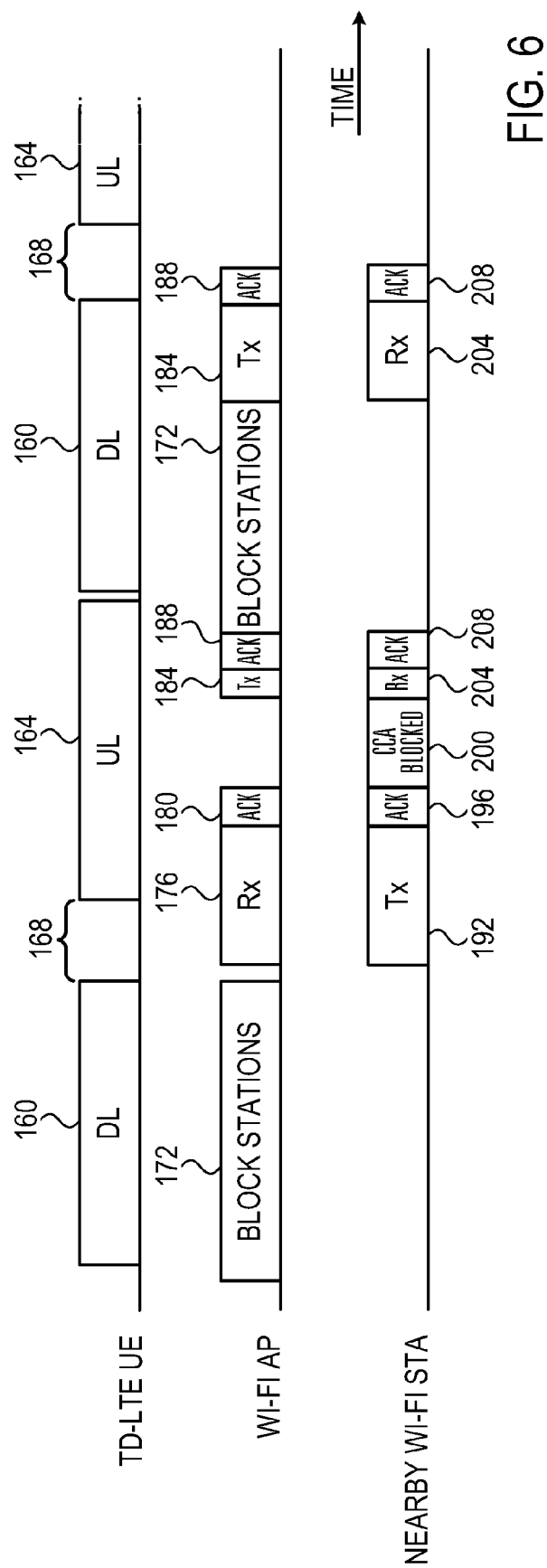
FIG. 6 is a diagram showing timing of LTE and Wi-Fi transmissions, in accordance with an embodiment of the present invention.

FIG. 6 is a diagram showing timing of LTE and Wi-Fi transmissions, in accordance with an embodiment of the present invention. The figure illustrates an example coexistence scheme using which device 134 reduces interference from the Wi-Fi transmissions of nearby STA 146 to LTE reception of BB processor 150.

The top of FIG. 6 shows the frame pattern of the TD-LTE UE (BB processor 150), the middle of the figure shows the operation of the Wi-Fi AP in device 134 (BB processor 154), and the bottom of the figure shows the operation of the nearby Wi-Fi STA 146.

BB processor 150 operates in an alternating pattern of DL intervals 160 and UL intervals 164. An UL guard interval 168 is inserted between each DL interval 160 and the following UL interval 164. In an embodiment, DL intervals 160 and UL intervals 164 are of the same size, i.e., a 50%/50% ratio between UL and DL time. Each DL and UL interval in this embodiment is on the order of 2.2 ms and guard interval 168 is on the order of 0.6 ms. Alternatively, any other suitable values can be used.

In some embodiments, the collocated Wi-Fi AP (BB processor 154) synchronizes the Wi-Fi time base to the LTE frame time base of BB processor 150. BB processor 154 schedules its Wi-Fi operations based on the LTE framing, as described below. During DL intervals 160, BB processor 154 may transmit signals to STA 146 so as to block the traffic of STA 146 (e.g., using a CTS-to-self message or any other suitable technique) until at least the beginning of the next UL guard interval 168, in order to prevent interference from STA 146 to LTE reception of BB processor 150.

Blockage intervals 172, in which STA 146 is blocked from transmitting, are shown in the middle of the figure. As can be seen in the figure, STA 146 does not transmit during LTE DL intervals 160, i.e., during LTE reception in BB processor 150. Thus, the major cause of interference in system 130 is eliminated.

Because of this blocking, in most scenarios, STA 146 will start its transmission burst 192 during the UL guard interval, because it was blocked from transmitting up to this point. Transmission burst 192 may end either before or after the start of the following LTE UL interval 164. In either case, burst 192 will be received successfully by the AP (BB processor 154). The reception of burst 192 is shown as an interval 176 in the figure.

In most cases burst 192 will end before the current UL interval 164, due to the assumption of high MCS enabled by the proximity between STA 146 and device 134. As explained above, since STA 146 is in close proximity to device 134, communication between STA 146 and device 134 can be carried out using a high MCS that shortens the communication bursts and enables them to fit outside LTE downlink intervals 160.

Upon receiving burst 192, BB processor 154 should respond immediately with an ACK 180. The ACK may be transmitted using a low bit rate, since STA 146 may be slightly interfered or de-sensitized by the LTE UL transmission in interval 164. The reception of ACK 176 in STA 146 is shown as an interval 196. Typically, STA 146 will not start transmitting new bursts during the same LTE UL interval 164, since its CCA mechanism may be blocked as a result of the LTE transmission. The CCA blockage period is shown as an interval 200.

In some embodiments, the Wi-Fi AP in device 134 (BB processor 154) may schedule its transmissions 184 to start during LTE UL interval 164 or during the following LTE DL interval 160, as long as the transmissions are scheduled such that the expected ACKs from STA 146 (marked as intervals 208 and received at the AP as intervals 188) are calculated to be received during LTE UL interval 164 (the current UL interval 164 or a subsequent interval 164).

In some embodiments, the AP (BB processor 154) may reduce the MCS of transmissions 184 if the transmissions occur during UL interval 164, in order to account for cases where STA 146 cannot handle high MCS in conjunction with a high interference from the LTE UL transmission (of BB processor 150).

In some embodiments, the AP (BB processor 154) may extend the duration of a given transmission 184 beyond the LTE DL interval 160, such that ACK 208 will be received during an LTE UL interval 164. The AP may extend the duration of transmission 184, for example, by intentionally reducing the MCS used in the transmission, by adding dummy information bytes to the transmission, by concatenating multiple packets to form a single long transmission 184, or using any other suitable technique.

In some embodiments, towards the end of LTE UL interval 164, the AP (BB processor 154) either starts a new transmission 184 or blocks the following LTE DL interval 160 from STA transmissions (using a CTS-to-self process or any other suitable technique). This blockage (interval 172) should end at or after the beginning of the next UL guard interval 168. The AP may schedule the end of blockage interval 172 to be followed immediately by a transmission burst 184, which itself ends either at the end of the DL interval 160 or during UL guard interval 168. In such case, the corresponding ACK 208 is received during the UL guard interval or during the following UL interval 164.

In some embodiments, the Wi-Fi AP of device 134 (BB processor 154) blocks or defers its transmissions to STA 146, such that STA 146 will not transmit acknowledgement messages to these transmissions during the downlink intervals of the LTE connection. This technique prevents interference from ACKs transmitted by STA 146 to LTE reception of BB processor 150.

In some embodiments, the AP (BB processor 154) communicates with additional Wi-Fi STAs (e.g., STA 142) that are not nearby the AP (and therefore do not cause interference to the LTE UE reception). For example, BB processor 154 may schedule communication with the other STAs at any time (e.g., during LTE UL intervals 164 or DL intervals 160). When blocking the Wi-Fi channel (during intervals 172 that prevent nearby STA 146 from transmitting), BB processor 154 may transmit the blockage transmissions (e.g., CTS-to-self) with low power, so as to selectively block only nearby STA 146 but still allow other STAs to communicate.

In some embodiments, BB processor 154 may refrain from blocking the Wi-Fi STA during LTE DL intervals 160, if the LTE DL signal is received in BB processor 150 at a level that exceeds a certain threshold.

In some cases, the LTE UL transmitted signal (in intervals 164) is lower than a certain threshold, such that the CCA mechanism of STA 146 is not activated. In some embodiments, BB processor 154 may protect LTE DL intervals 160 by initiating explicit Wi-Fi transmission (or blocking) in order to prevent STA 146 from starting new transmission bursts 192. In these embodiments, the blocking operation should have priority over the attempts of STA 146 to transmit another burst 192. This priority may be achieved, for example, by modifying the AP random back-off process (per the Carrier-Sense Multiple Access (CSMA) Medium Access Control (MAC) protocol of Wi-Fi).

In some embodiments, the blockage scheme of FIG. 6 may combined with the BSR-based schemes of FIGS. 2-4 above, so as to create known (often long) periods of no LTE UL data transmissions.

In some embodiments, the LTE UE (BB processor 150) may be required to periodically perform measurements that monitor surrounding BSs (eNodeBs). In these embodiments, the LTE UE (BB processor 150) may inform the collocated AP (BB processor 154) of the measurement intervals, and the AP may block nearby STA 146 from transmitting during these intervals. This additional protection mechanism may also be applied in cases of sensitive LTE periods, such as handover periods or known periods used for transmitting system control information.

Coexistence Between Collocated Wi-Fi and LTE Device Operating in SPS/DRX Mode

The LTE specifications define two modes in which the UE operates in a sparse pattern of activity periods in order to scheduling overhead and/or save battery power—Semi-Persistent Scheduling (SPS) and Discontinuous Reception (DRX). SPS and DRX are specified in section 5 of 3GPP TS 36.321, cited above. In both modes (which may be used separately or applied together to the same UE) the UE is pre-configured with a pattern of activity periods separated by inactivity periods.

The pattern is synchronized between the UE and the BS, such that the UE is able to predict in advance in which LTE sub-frames no uplink or downlink activity will occur. Thus, the UE may wake up and communicate with the BS as needed in the activity periods, while remaining in sleep mode during the inactivity periods. For example, the pattern may define a 1 ms activity period every 20 ms, a 5 ms activity period every 15 ms, or any other suitable pattern.

Consider the system configuration of FIG. 1 above. In some embodiments, LTE BB processor 44, which functions as an LTE UE, is configured by BS 28 to operate in a SPS and/or DRX mode. As part of this configuration, the BS configures BB processor 44 with the desired pattern of activity and inactivity periods. BB processor 44 provides the pattern, possibly along with additional information, to Wi-Fi BB processor 48 (which may function either as a STA or as an AP) over the coexistence interface. BB processor 48 uses this information to configure the Wi-Fi operation so as to reduce mutual interference.

In various embodiments, BB processor 48 may configure its own Wi-Fi transmissions and/or the transmissions of the opposite Wi-Fi endpoint (STA or AP 32). Configuring the AP or STA may involve configuring the Wi-Fi transmissions and/or receiver functionality. This configuration may be used for reducing interference from Wi-Fi transmission of BB processor 48 to LTE reception of BB processor 44, and/or interference from LTE transmission of BB processor 44 to Wi-Fi reception of BB processor 48. In order to facilitate this operation, BB processor 44 typically provides the LTE frame timing to BB processor 48 over the coexistence interface. Wi-Fi BB processor 48 synchronizes its internal time base to the LTE frame timing provided by BB processor 44.

Typically, BB processor 44 provides the pattern and associated information to BB processor 48 in advance in order to allow BB processor 48 sufficient time to configure the Wi-Fi operation. The information provided may comprise, for example, which sub-frames are defined as active and which are defined as inactive, which of the active sub-frames are to be used for UE transmission (uplink) and which are to be used for UE reception (downlink), signal power levels on transmission and reception, type of signal to be transmitted or received, and/or any other suitable information.

In an example embodiment, BB processor 48 sets the timing of Wi-Fi transmissions based on the pattern of LTE active and inactive periods. The timing can be set either locally for transmissions of BB processor 48, or remotely for transmissions of the opposite AP or STA 32 (e.g., using a CTS-to-self process), or both.

In one example embodiment, BB processor 48 may prevent any Wi-Fi transmission during active LTE periods. In other embodiments, BB processor 48 may prevent Wi-Fi transmissions at a finer granularity, e.g., prevent only Wi-Fi transmissions from device 24 during active periods used for reception in BB processor 44.

In some embodiments, the LTE UE (BB processor 44) is required to periodically perform measurements that monitor surrounding BSs (eNodeBs). In these embodiments, the LTE UE notifies the collocated Wi-Fi device (BB processor 48) of the measurement intervals, and BB processor 48 reduces interference during the reported intervals.

In some embodiments, the pattern of activity/inactivity periods is adapted in accordance with various system parameters on the LTE and/or Wi-Fi channels, such as based on the current transmit power, the MCS that is currently in use, the receive power of the opposite side's transmissions, the amount of traffic transmitted, and/or any other suitable system parameter.

Figure 7:
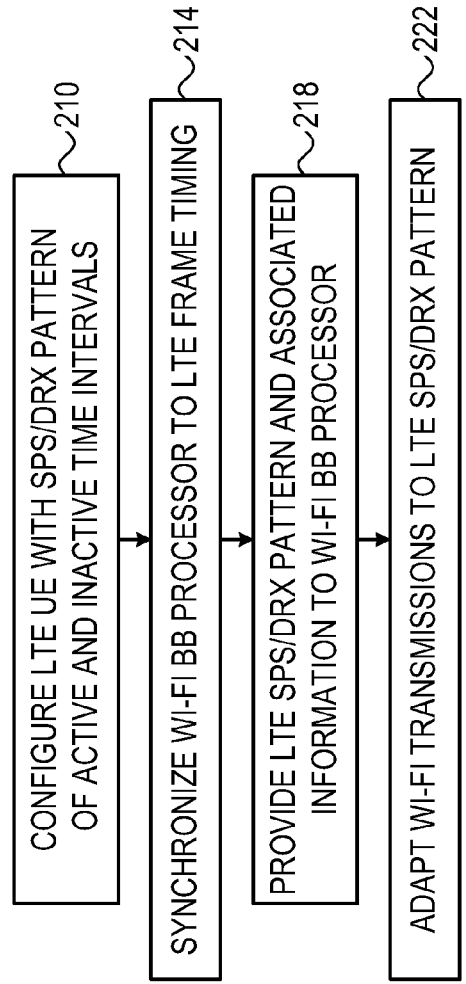
FIG. 7 is a flow chart that schematically illustrates a method for LTE/Wi-Fi coexistence, in accordance with yet another embodiment of the present invention.

FIG. 7 is a flow chart that schematically illustrates a method for LTE/Wi-Fi coexistence, in accordance with yet another embodiment of the present invention. The method begins with BS 28 configuring the LTE UE in device 24 (BB processor 44) with a pattern of active and inactive time periods, in accordance with the SPS and/or DRX mode, at a configuration step 210.

Wi-Fi BB processor 48 synchronizes its internal time base to the LTE frame timing of LTE BB processor 44, at a synchronization step 214. LTE BB processor 44 provides the pattern of active and inactive time periods to Wi-Fi BB processor 48, at a pattern notification step 218. Wi-Fi BB processor 48 adapts the Wi-Fi operation (its own local operation and/or the operation of the opposite Wi-Fi STA or AP) based on the pattern, at a Wi-Fi adaptation step 222. The adaptation attempts to reduce or eliminate interference between the LTE and Wi-Fi connections.

The configurations of devices 24 and 134 shown in FIGS. 1 and 5 are example configurations, which are chosen purely for the sake of conceptual clarity. In alternative embodiments, any other suitable device configuration can be used. For example, LTE and Wi-Fi communication may be carried out via separate antennas. As another example, the functions of BB processors 44 and 48, or BB processors 150 and 154, may be carried out by a single BB processor. In the present context, BB processors 44 and 48 of FIG. 1, and BB processors 150 and 154 of FIG. 5, are referred to collectively as baseband circuitry that carries out the disclosed techniques. Certain elements of device 24 or device 134 may be implemented using hardware, such as using one or more Application-Specific Integrated Circuits (ASICs) or Field-Programmable Gate Arrays (FPGAs). Alternatively, some elements of device 24 or device 134 may be implemented in software or using a combination of hardware and software elements.

In some embodiments, functions of device 24 or device 134 may be implemented using a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
in a wireless device, establishing a first connection with a base station (BS) of a long-range wireless data network, and a second connection on a Wireless Local Area Network (WLAN);
selecting in the wireless device a time interval for communicating over the second connection;
in preparation for the selected time interval, causing the BS to refrain from scheduling data transmission from the wireless device to the BS over the first connection during the time interval, by reporting to the BS prior to the time interval that no data is pending for transmission from the wireless device, even when some data is actually pending for transmission to the BS; and
communicating using the wireless device over the second connection on the WLAN during the time interval;
wherein reporting that no data is pending is performed even when some data is pending for transmission to the BS, so as to cause the BS to schedule transmission of the pending data outside the time interval.

2. The method according to claim 1, wherein reporting that the data is pending comprises reporting an amount of the data that is different from an actual size of the pending data, so as to control a size of the scheduled transmission.

3. The method according to claim 1, wherein the long-range wireless data network operates in accordance with a Long Term Evolution (LTE) specification, and wherein reporting that no data is pending comprises sending a Buffer status Report (BSR) message.

4. The method according to claim 1, and comprising applying a communication pattern that alternates between the first and second connections, by alternately reporting to the BS that data is pending and that no data is pending.

5. The method according to claim 1, and comprising inhibiting communication over the second connection prior to and following the selected time interval.

6. The method according to claim 1, wherein reporting to the BS comprises sending to the BS a reporting message at a time that takes into account a scheduling latency of the first connection.

7. A wireless device, comprising:
a Radio Frequency (RF) front end, which is configured to exchange RF signals so as to communicate on a long-range wireless data network and on a Wireless Local Area Network (WLAN); and
baseband circuitry, which is configured to establish, via the RF front end, a first connection with the BS of the long-range wireless data network and a second connection on the WLAN, to select a time interval for communicating over the second connection, to cause the BS, in preparation for the selected time interval, to refrain from scheduling data transmission from the wireless device to the BS over the first connection during the time interval by reporting to the BS prior to the time interval that no data is pending for transmission from the wireless device, even when some data is actually pending for transmission to the BS, and to communicate using the wireless device over the second connection on the WLAN during the time interval;
wherein reporting that no data is pending is performed even when some data is pending for transmission to the BS, so as to cause the BS to schedule transmission of the pending data outside the time interval.

8. A method for communication, comprising:
in a wireless device, establishing a first connection with a base station (BS) of a long-range wireless data network in an interleaved sequence of uplink intervals, for transmitting to the BS, and downlink intervals, for receiving from the BS;
establishing in the wireless device, concurrently with the first connection, a second connection with a station of a Wireless Local Area Network (WLAN) that is located in close proximity to the wireless device; and
preventing interference from out-of-band transmission of the station on the second connection to reception of the BS on the first connection, by transmitting signals from the wireless device to the station so as to block the station from transmitting during the downlink time intervals;
wherein preventing the interference comprises scheduling transmissions from the wireless device to the station such that respective acknowledgements from the station occur during the uplink intervals of the first connection.

9. The method according to claim 8, wherein preventing the interference comprises blocking the wireless device from transmitting to the station on the second connection so as to prevent the station from transmitting acknowledgement messages to the wireless device during the downlink time intervals.

10. The method according to claim 8, wherein preventing the interference comprises sending to the station a Clear To Send (CTS)-to-self message.

11. The method according to claim 8, wherein scheduling the transmissions comprises setting respective parameters of the transmissions such that the acknowledgements occur during the uplink intervals.

12. The method according to claim 11, wherein the parameters comprise at least one parameter type selected from a group of types consisting of durations and start times of the transmissions.

13. The method according to claim 8, wherein preventing the interference comprises communicating with the station using a Modulation and Coding Scheme (MCS) that is selected such that the transmission of the station fits outside the downlink intervals.

14. The method according to claim 8, and comprising transmitting to the station using a Modulation and Coding Scheme (MCS) that is selected to account for the interference from the transmission of the wireless device over the first connection to the reception of the station over the second connection.

15. The method according to claim 8, and comprising transmitting acknowledgement messages to the station at a power level that is lower than a normal power level used for data transmission to the station, and setting a Modulation and Coding Scheme (MCS) of the acknowledgement messages to match the power level.

16. The method according to claim 8, wherein preventing the interference comprises transmitting the signals at a power level that is selected so as to block the station but refrain from blocking other stations that are not in close proximity to the wireless device.

17. The method according to claim 8, wherein preventing the interference comprises synchronizing in the wireless device a time base of the second connection to a frame time base of the first connection.

18. A wireless device, comprising:
  a Radio Frequency (RF) front end, which is configured to exchange RF signals so as to communicate long-range wireless data network and on a Wireless Local Area Network (WLAN); and
  baseband circuitry, which is configured to establish, via the RF front end, a first connection with a base station (BS) of the long-range wireless data network in an interleaved sequence of uplink intervals, for transmitting to the BS, and downlink intervals, for receiving from the BS, to establish, concurrently with the first connection, a second connection with a station of the WLAN that is located in close proximity to the wireless device, and to prevent interference from out-of-band transmission of the station on the second connection to reception of the BS on the first connection, by transmitting signals from the wireless device to the station so as to block the station from transmitting during the downlink time intervals;
  wherein preventing the interference comprises scheduling transmissions from the wireless device to the station such that respective acknowledgements from the station occur during the uplink intervals of the first connection.

* * * * *